United States Patent

Duret et al.

[11] 4,053,126
[45] Oct. 11, 1977

[54] HELICOPTER CABIN AND METHOD OF MAKING SAME

[75] Inventors: Maurice Louis Duret, Aix-en-Provence; Pierre Barnoin, Eguilles, both of France

[73] Assignee: Societe Nationale Industrielle Aerospatiale, Paris, France

[21] Appl. No.: 633,439

[22] Filed: Nov. 19, 1975

[30] Foreign Application Priority Data

Nov. 26, 1974 France .................... 74.38661

[51] Int. Cl.² .............. B64C 1/00; B29D 3/00; B29C 5/04
[52] U.S. Cl. .................... 244/119; 244/117 R; 264/275; 264/279; 264/310
[58] Field of Search ......... 264/310, 311, 271, 275, 264/259, 279; 52/309; 244/119, 123, 124

[56] References Cited

U.S. PATENT DOCUMENTS

| | | | |
|---|---|---|---|
| 2,106,761 | 2/1938 | Roberts et al. | 244/123 |
| 2,602,469 | 7/1952 | Whiting | 264/311 |
| 2,859,151 | 11/1958 | Usab et al. | 264/311 |
| 2,937,022 | 5/1960 | Koller et al. | 264/311 |
| 2,944,814 | 7/1960 | Thoeming | 264/311 |
| 3,071,217 | 1/1963 | Gould | 244/119 |
| 3,432,979 | 3/1969 | Heiman | 52/309 |
| 3,555,756 | 1/1971 | Curran et al. | 52/309 |
| 3,714,312 | 1/1973 | Nitta et al. | 264/310 |
| 3,798,300 | 3/1974 | Verbeke | 264/310 |
| 3,875,275 | 4/1975 | Lemelson | 264/310 |

*Primary Examiner*—Willard E. Hoag
*Attorney, Agent, or Firm*—Merriam, Marshall & Bicknell

[57] ABSTRACT

The present invention relates to a process for making a thin-walled composite structure having resistance profiled elements, wherein a rotational-moulding mould is made, in the shape of said structure, then resistant profiled elements made of heat-conductive material are positioned in said mould, in order to form a main resistant frame-work for said structure, after which a suitable synthetic material is introduced into the mould and the known operations of rotational moulding are carried out. The structure thus produced may be used for the construction of aerodynes, and in particular in helicopter construction.

9 Claims, 14 Drawing Figures

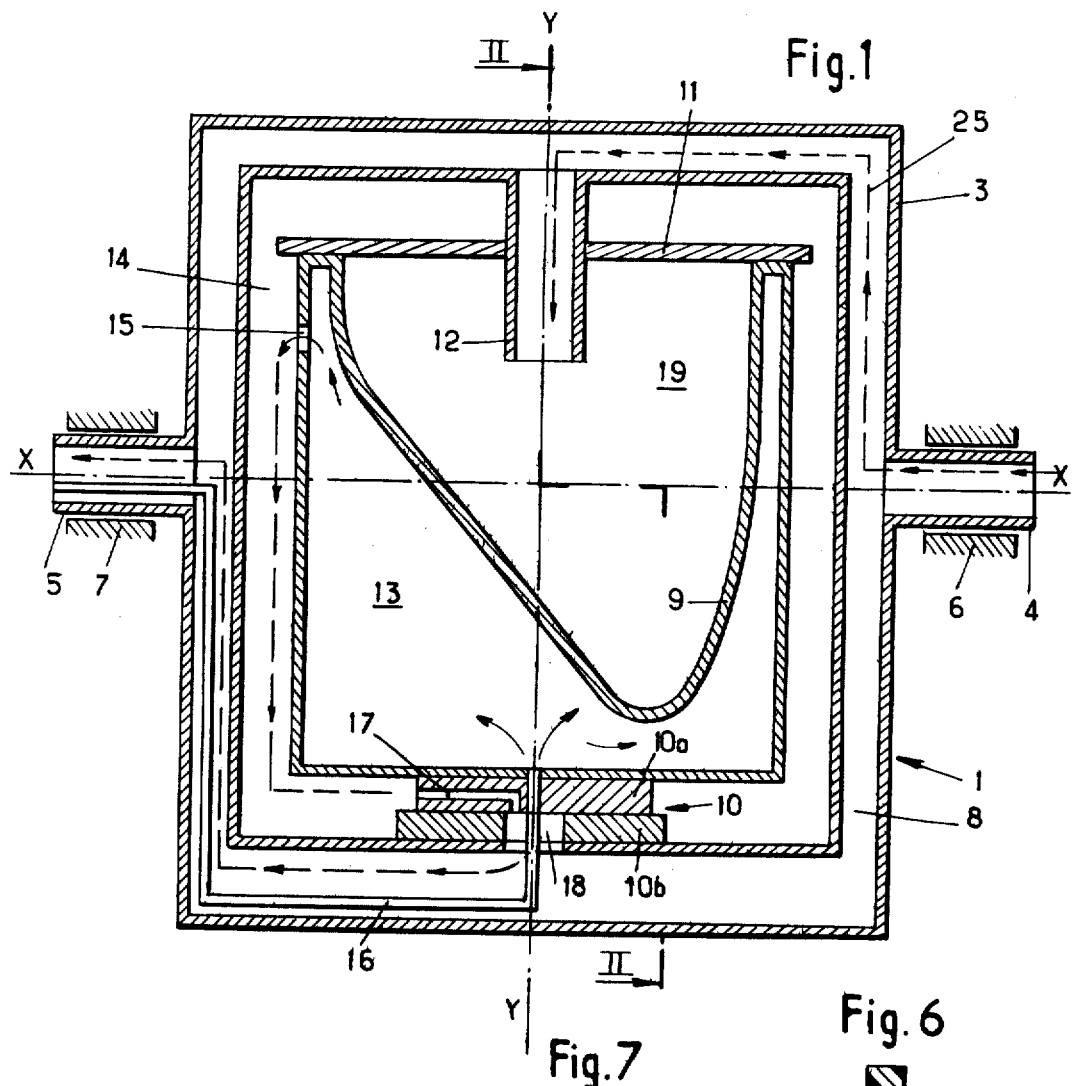
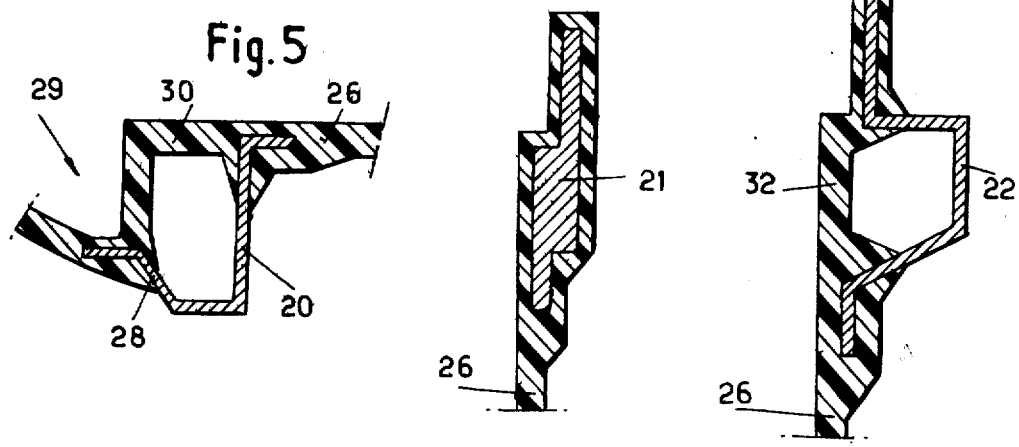

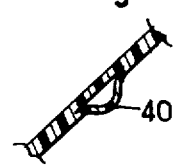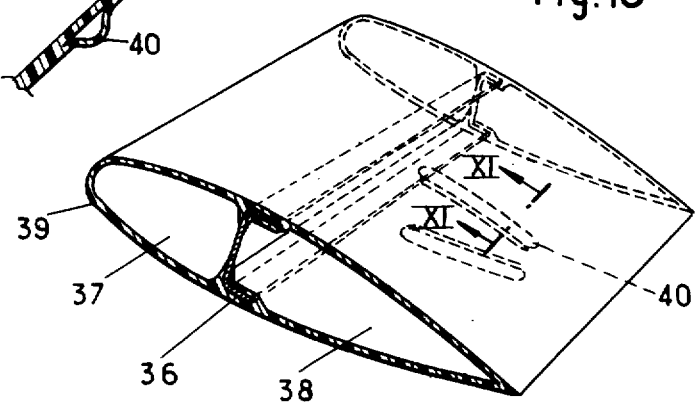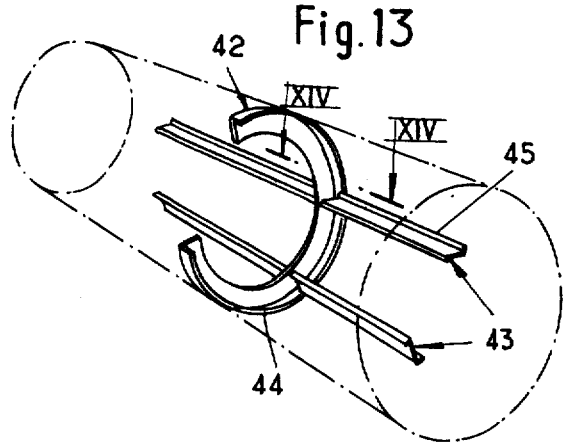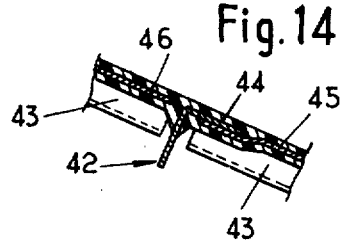

HELICOPTER CABIN AND METHOD OF MAKING SAME

The present invention relates to a process of making resistant, thin-walled composite structures particularly suitable for forming elements of aerodynes, and more especially of helicopters. It also relates to the structures obtained by carrying out this process.

The structural elements of helicopters, such as example the cockpit, fuselage, tail boom or stabilizer fins, are known to be constructed with the aid of thin metal walls reinforced by profiles of particular shapes on which said walls are fixed.

Such a method of construction requires complex, high-precision tools in order in particular to mass-produce portions of these elements whose shapes are particularly delicate to reproduce. This is the case, for example, of stiffeners or stringers of a canopy or cabin door frame. The cost price of such elements is consequently high.

Moreover, they often necessitate numerous connecting pieces such as gussets or local reinforcements. In certain cases, selective reinforcements are also provided, made of laminates based on highly resistant filaments, for example of carbon or boron, which are fixed to the webs or flanges of the profiled metallic elements in order locally to give the element a surface and inertia compatible with the static or dynamic stresses met with during the evolutions of the aerodyne.

The placing and fixing of these connecting pieces and reinforcements naturally involve long and therefore expensive operations. Moreover, the elements are rendered heavier.

The present invention intends to remedy these drawbacks and provides for a process of making resistant, thin-walled, composite structures simply and inexpensively.

To this end, the process according to the invention for making a thin-walled composite structure with resistant profiled elements, particularly for an aerodyne, by the rotational moulding technique is noteworthy in that resistant profiled elements made of a heat conducting material are positionned in a rotational-moulding mould, having the shape of said structure, taking at least partially and approximately the shape of the inner wall of said mould and intended to constitute a main resistant frame for said structure, after which a suitable synthetic material is introduced into the mould and the rotational moulding operations are carried out.

The resistant profiled elements are preferably made of metal. In this way, composite structures are obtained which comprise a main metallic frame, embedded or partially embedded in a synthetic material to ensure, in cooperation with said synthetic material, the shape of the structure, as well as the general or local resistances necessary.

The known technique of moulding by rotation for making thin-walled composite structures with profiled elements therefore enables such structures having both the desired shape and resistance to be obtained simply.

Moreover, the invention enables almost all the connecting pieces and reinforcements mentioned hereinabove to be eliminated, this reducing the number of pieces and therefore allowing a considerable saving of weight.

For a precise design of the mould, which takes into account the parts to be reinforced locally and the reinforcing elements, the invention makes it possible to obtain mass produced aerodyne cell units faithfully and at a very low price.

According to the invention, in order to obtain zones of local reinforcement for the structure, cut fibres constituted by a heat-conductive material are disposed in the mould at those places corresponding to such zones.

The resistant profiles advantageously present an open cross section and form stiffeners or stringers whose hollow cross section is closed by at least one strip of the synthetic material of the thin walls. This strip may cover a flat, metal or plastic profile.

In accordance with the invention, the resistant profiles preferably form the frames of openings in said structures, form longitudinal girders of this latter or are disposed along lines of join of several thin walls.

BRIEF DESCRIPTION OF THE DRAWINGS

The invention will be more readily understood on reading the following description given with reference to the accompanying drawings in which:

FIG. 1 shows a schematic sectional view of a mould for obtaining a helicopter cabin according to the invention.

FIG. 5 is an enlarged section along V—V of FIG. 3 and illustrates an embodiment of a door frame for said cabin.

FIGS. 6 and 7 show sections along VI—VI of FIG. 3 of two variant embodiments of the frame of a canopy for said cabin.

FIG. 10 shows in perspective a part of a wing made according to the invention.

FIG. 11 and FIG. 12, as variants, correspond to a section along XI—XI of FIG. 10.

FIG. 13 shows in perspective the arrangement of resistant elements relative to a helicopter tail boom before introduction of the plastics material into the rotational-moulding mould.

FIG. 14 is a section along the line XIV—XIV of FIG. 13, after introduction of synthetic material into the mould.

Referring now to the drawings, FIGS. 1 and 2 show in vertical sections a rotational-moulding mould 1, intended for making a helicopter cabin 2 shown in FIGS. 3 and 4.

Figure 2:
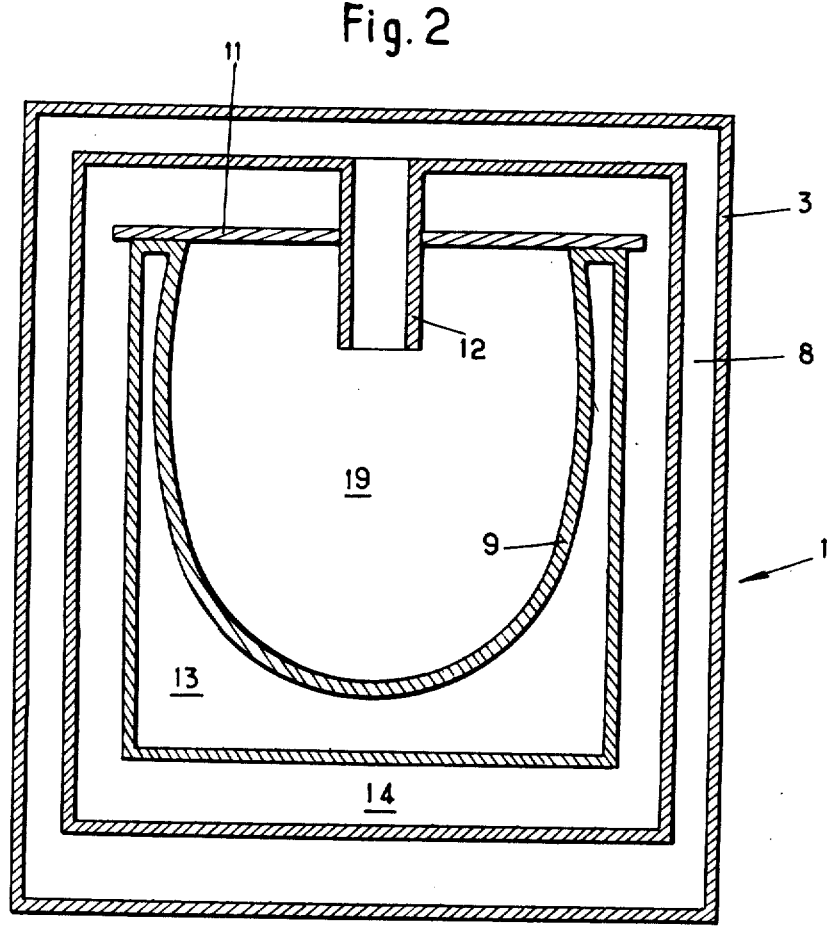
FIG. 2 is a section along II—II of FIG. 1.

The mould 1 described by way of example with reference to FIGS. 1 and 2, is of the known type comprising double walls enabling circulation of a thermofluid. It is obvious that this example does not limit the scope of the invention and that the mould used may be of another type; for example, it could comprise a hot enclosure inside which a rotary mould would be mounted.

The mould 1 of FIGS. 1 and 2 comprises a double-walled enclosure 3 which may rotate about a horizontal axis X—X, on shafts 4 and 5 turning in fixed bearings 6 and 7. The shafts 4 and 5 are hollow and communicate with the intermediate space 8 of the double wall of the enclosure 3. Inside this latter is disposed a mould 9, also double walled, rotatable about an axis Y—Y, perpendicular to axis X—X.

To this end, a rotary bearing 10, in two parts 10a and 10b, rotating with respect to each other, connects the enclosure 3 to the mould 9. Furthermore, said latter is obturated by a plate 11 which is not a heat conductor, provided with a centering aperture through which a sleeve 12, coaxial with axis Y—Y and opening into the intermediate space 8 of the double wall of the enclosure 3, passes. The mould 9 may be provided to be in two separable parts, particularly for demoulding purposes.

The intermediate space 13 of the double wall of the mould 9 is placed in communication, on the one hand with space 14, separating said mould from the enclosure 3, by means of an orifice 15, on the other hand with the outside via a conduit 16 passing through the rotary bearing 10, the intermediate space 8 and the shaft 5. Moreover, the spaces 14 and 8 communicate together via conduits and opening 17 and 18 made in two parts 10a and 10b of the rotary bearing 10.

The internal cavity 19 of the mould 9 corresponds to the helicopter cabin 2. As shown in FIGS. 3 to 9, the helicopter cabin 2 is formed of a framework of metal profiles 20 to 24 connected to thin walls 26 made of synthetic material. These profiles are totally or partially embedded in said synthetic material.

The metal profiles or channels 20, for example, form the frame of the side doors 27. They are approximately in the form of a "U" whose arms are partially embedded in the synthetic material of the walls 26 (FIG. 5). This "U" is located inside the cabin and it gives the frame of the doors 27 a sufficient rigidity to avoid any exaggerated deformation ant to form, by means of one of its shorter arms 28, a groove 29 which ensures a good seal, due to its suppleness.

Each metal profile 20 constitutes the main resistant part of the frame, whilst the synthetic zone 30 which closes it ensures the secondary resistant part, whilst guiding the deformations of the section within suitable limits. The sections thus defined enable an optimum to be obtained for a structure, in the resistance/weight ratio, which leads to simple and economical productions.

FIGS. 6 and 7 illustrate the production of frames for the canopy 31.

FIG. 6 shows, in the same way as FIG. 5, a closed frame comprising a metal profile 22 approximately in the form of a "U" closed by a synthetic part 32, the arms of the profile 22 being partially embedded in the synthetic material.

FIG. 7 shows a variant embodiment of said frame, in which a metal profile 21 which is compact and of precise shape, is completely embedded in the synthetic material.

Figure 8:
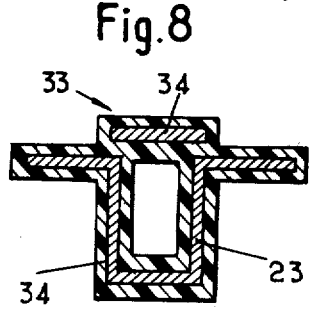
FIG. 8 is a section along VIII—VIII of FIG. 3 of the central upright of the canopy of the cabin shown in said FIG. 3.

FIG. 8 which shows a section through the central upright 33 of canopy 31 shows a metal profile 23 in "U" form, completely embedded in a coating of a synthetic material 34. The cross section of this profile 23 may furthermore be closed by said coating of synthetic material and, to effect a local reinforcement, a plastic element 34, in the form of a strip, is inserted therein. Such a combination of three elements makes it possible to obtain a stiffner whose section and rigidity may be adapted to the various conditions of used in the structure. Of course, several combinations may be made from this example and the synthetic element 34 may advantageously be replaced by a metal element, or may quite simply be eliminated.

Figure 9:
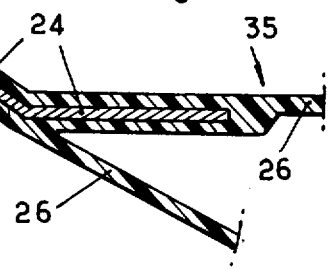
FIG. 9 shows in section along line IX—IX of FIG. 4, the junction between the floor and the side walls of the cabin.
Figure 3:
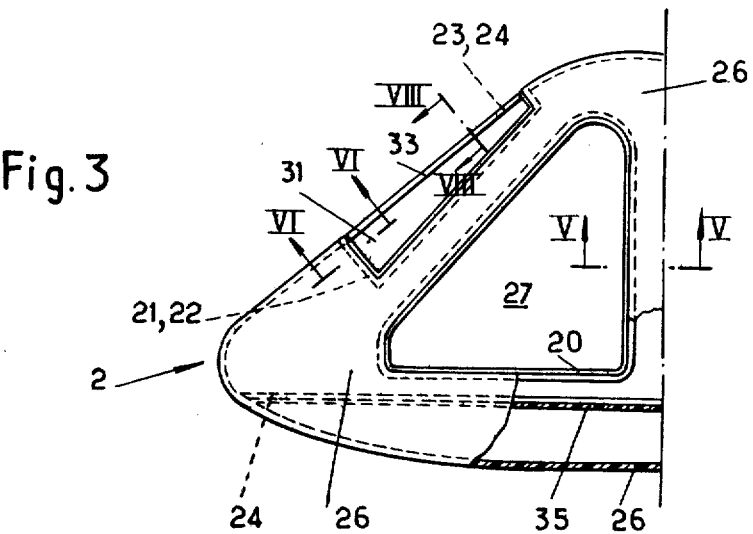
FIGS. 3 and 4 show, respectively, a partial view in elevation and in plan of the helicopter cabin, obtained by using the mould shown in FIGS. 1 and 2.
Figure 4:
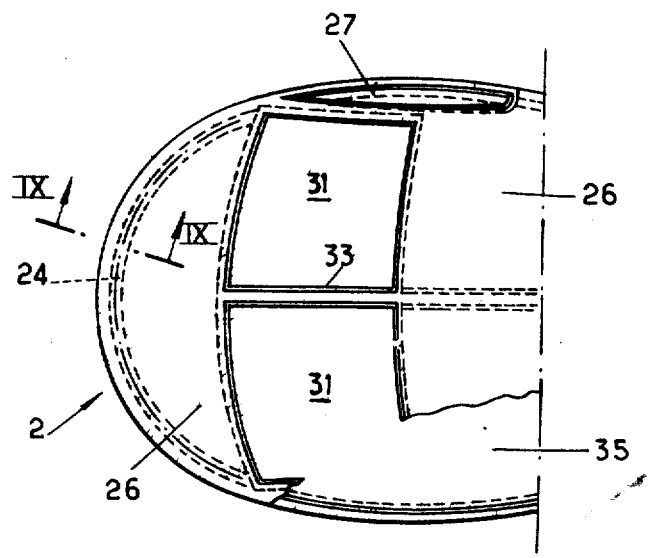

FIG. 9 indicates how the addition of a metal profile 24 in open "V" form enables a reinforcement to be obtained at the junction with the cabin floor 35. Such a connection, which ensures the continuity of the synthetic part of the structure, may easily be used at other spots, for example for fixing the instrument board or for making any local reinforcement, particularly where the locks are located. The helicopter cabin 2, shown in FIGS. 3 to 9 may easily be obtained by rotational moulding, by means of the mould 1 described with reference to FIGS. 1 and 2.

To this end, inside the cavity 19 of the mould 1, are firstly positioned and fixed the different metal profiles 20 to 24, and possibly 34, after which the desired quantity of a powdered synthetic material is introduced. Of course, the mould 1 is cold whilst the metal profiles are being arranged and the synthetic material is being introduced.

The synthetic material may be chosen from the following plastics materials, and it is understood that the list is non-limiting: butadiene, styrene, polycarbonate, polymethacrylate, polyolefin, polyurethane, polysulfone, polypropylene, oxidised or sulfurised polyphenylene, polyamide.

These materials may be charged with pulverulent additions or cut fibres.

The quantity of synthetic material introduced into the mould determines the weight of cabin 2, the thickness of the walls 26 and of the coatings of profiles 20 to 24 and 34.

After the synthetic material has been introduced, the mould is locked, then rotated (by means which have not been shown in the drawings) about axis X—X and axis Y—Y, whilst a hot thermofluid is introduced into pipe 16 through shaft 5. This thermofluid therefore penetrates into the space 13, then into space 14 (through orifice 15) and space 8, before escaping to the outside of the mould 1. An inert gas may, in known manner, be introduced into the cavity 19, along path 25.

After fusion of the synthetic material introduced into the mould 1, the hot thermofluid is replaced by a cooling thermofluid, passing along the same path, whilst the movements of rotation about the axes X—X and Y—Y continue. At At end of the cooling, the movements of rotation of the mould 1 are stopped, the mould is unlocked and the cabin 2 is removed therefrom.

To obtain a satisfactory result, it is obvious that the metal profiles must be disposed and provided to allow a correct diffusion of the heat and to promote a good flow of the molten synthetic material. To protect them from a coating of synthetic material, the parts of the profiles which are to remain bare are coated with a thermal screen for example made of asbestos.

Similarly, it is possible, with the aid of thermal screens, to reserve the locations of doors 27 and canopy 37. However, it may sometimes be preferable, after the final product has been obtained for reasons of economy, to make various cuts to create openings rather than to provide in the design of the mould zones which are not touched by the circulation of the molten synthetic material.

It will be noted that, although it is difficult to provide profiles continuously, for example in the case of a very elaborate local shape (frame of door or canopy in particular), the process according to the invention allows these profiles to be split up into several parts. These parts being embedded in the synthetic material, all the problems of connection will easily be solved.

The advantage of being able to use moulding by rotation for making any frame shapes is furthermore increased, as indicates in FIGS. 5 to 8, by the mixing disposition of the materials.

In fact, the combined use of synthetic material and metal enables profiles to be made having complicated and varied cross-sections. It will suffice to provide for the parts of delicate cross-section or of the twisted shape to be made of moulded plastics, whilst the easily definable contour is formed by the metal profile.

Thus, with the use of closed metal profiles, possibly combined with compact reinforcements such as reinforcement 34, the rotational moulding process applied to the construction of structures with resistant hulls, enables the delicate problems of framing of the openings in particular to be solved.

With the aid of rotational-moulding moulds (not shown) similar to that of FIGS. 1 and 2, it is also possible, due to the invention, to make other parts of an aerodyne, e.g. a wing (cf. FIG. 10), a fuselage part (cf. FIG. 13) or a fuel reservoir.

In this way, for the elements essentially acted upon by the aerodynamic loads, such as for example the part of the wing shown in FIG. 10, the longeron 36 which receives all the flexion forces, is constituted by a metal profile whose flanges and/or ends are embedded in the synthetic material.

In a preferred embodiment, the longeron 36 is obtained by a single U-shaped sheet whose web defines, in the terminated wing two longitudinal caissons 37 and 38. These caissons, completely closed by the synthetic coating 39, form the torsion-resistant parts. Variants may be made from this design. It may be advantageous to design a longeron constituted by several parts to facilitate the variations in shape or the introductions of forces, partially or completely embed said longeron in the synthetic material, and also make a wing with several longerons.

For the purpose of obtaining a coating 39 which is perfectly stable and sufficiently rigid to support the action of the aerodynamic pressures without residual deformations, supplementary reinforcing means may be incorporated inside the coating of the wing.

To this end, FIG. 11, which corresponds to section XI—XI through FIG. 10, shows one of these means which is simply a local protuberance 40, whilst FIG. 12 shows, as a variant, how a rigid element 41, which may be metallic or synthetic, is inserted into the coating to define therewith a local reinforcement.

Other variants may be envisaged: for example, the addition of conventional ribs, spaced out spanwise in a certain order, the form of which in cross-section is comparable to that of longeron 36.

FIG. 13 shows in perspective two types of essential metal elements 42 and 43 of the fuselage frame or the tail boom of an aerodyne. According to this perspective view, the rings 42 and longitudinals 43 which define the resistant frame, are shown in position of assembly, inside the mould, before instruction of the plastics material therein.

After construction of the coating of the structure, the connection between the rings and the longitudinals is effected by coating the longitudinal and peripheral flanges 44 and 45 of these elements, as shown in FIG. 14, which corresponds to line XIV—XIV of FIG. 13. To improve the mechanical characteristics at these connections, cut fibres 46 of highly-resistant filaments, e.g. glass, carbon, or boron, are introduced with the charge of plastics material, which thus becomes the support matrix for these local reinforcements.

The structures made according to the invention may, moreover, use the possible combinations of rotational-moulding. They may for example be constituted by several layers of the same nature or different nature and comprise, by the choice of the resin, a transparent part. Apart from the aeronautic field, numerous applications of the invention are advantageous, particularly in the construction of automobile bodies reservoirs or large-dimension tanks, in the construction of buildings or boat hulls, i.e. wherever a framework incorporated in an envelope of synthetic material enables a light, resistant structure to be obtained.

What we claim is:

1. A method for making a helicopter cabin, in the form of a thin-walled hollow structure, with apertures corresponding to doors and a canopy, and having an internal floor incorporated into the structure, which comprises forming frames composed of elongated metal elements corresponding respectively to the frames of the doors and canopy and to a junction line between said floor and said structure, said frames being made of U-shaped, open channels; positioning said frames within a rotatable mold with said frames adjacent the wall thereof, disposing open sides of said U-shaped open channels toward molding surfaces of said mold; introducing a molding material into said mold, and heating and rotating said mold to cause said material to form a relatively thin shell following the contours of said mold, interconnecting said frames, and embedding at least portions of said channels in said molding material adjacent said open ends along substantially the entire length of said shell and closing said open ends of said channels with said material.

2. The method of claim 1 including the step of depositing, before said shell is formed, fibers of a heat-conductive material in said mold adjacent selected sections of the wall thereof to serve as local reinforcement.

3. The method of claim 1 wherein said molding material is thermoplastic.

4. The method of claim 1 wherein said molding material includes reinforcing fibers.

5. A thin-walled composite helicopter cabin comprising an outer shell of a plastic material and frames of elongated metal elements at least partially embedded in said shell along substantially their entire lengths, said helicopter cabin being formed in accordance with the method of claim 1.

6. The cabin of claim 5 wherein said elements are entirely embedded in said shell.

7. The cabin of claim 5 wherein said shell contains at least one opening, the edges of which follow the contours of one of said frames.

8. The cabin of claim 5 in which said open sides of said U-shaped channels are spanned by an additional flat heat-conductive element entirely embedded in said shell.

9. The cabin of claim 5 wherein said plastic material is thermoplastic and contains reinforcing fibers.

* * * * *